(12) United States Patent
Fossum et al.

(10) Patent No.: US 7,380,169 B2
(45) Date of Patent: May 27, 2008

(54) CONVERTING MERGE BUFFER SYSTEM-KILL ERRORS TO PROCESS-KILL ERRORS

(75) Inventors: Tryggve Fossum, Northborough, MA (US); Yaron Shragai, Natick, MA (US); Ugonna Echeruo, Worcester, MA (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 10/948,904

(22) Filed: Sep. 24, 2004

(65) Prior Publication Data

US 2006/0075301 A1  Apr. 6, 2006

(51) Int. Cl.
*G06F 11/00* (2006.01)
(52) U.S. Cl. ........................................ 714/36
(58) Field of Classification Search .................. 714/36
See application file for complete search history.

(56) References Cited

U.S. PATENT DOCUMENTS

| | | | |
|---|---|---|---|
| 5,784,394 A * | 7/1998 | Alvarez et al. | 714/800 |
| 6,016,542 A * | 1/2000 | Gottlieb et al. | 712/225 |
| 6,026,499 A | 2/2000 | Shirakihara et al. | 714/11 |
| 6,269,478 B1 | 7/2001 | Lautenbach-Lampe et al. | 717/127 |
| 6,401,217 B1 | 6/2002 | Clark et al. | 714/20 |
| 6,567,935 B1 | 5/2003 | Figueroa | 714/37 |
| 6,622,260 B1 * | 9/2003 | Marisetty et al. | 714/10 |
| 6,745,322 B1 * | 6/2004 | Brockmann et al. | 712/239 |
| 7,114,104 B1 | 9/2006 | Bennett | 714/38 |
| 2004/0019835 A1 * | 1/2004 | Marisetty et al. | 714/48 |
| 2004/0205385 A1 * | 10/2004 | Smith | 714/6 |
| 2006/0075300 A1 * | 4/2006 | Mukherjee | 714/38 |

OTHER PUBLICATIONS

Bronevetsky, et al., "Application-level Checkpointing For Shared Memory Programs," ASPLAS '04, Oct. 7-13, 2004, Boston, Massachusetts, pp. 1-13.

* cited by examiner

*Primary Examiner*—Christopher McCarthy
(74) *Attorney, Agent, or Firm*—Trop, Pruner & Hu, P.C.

(57) ABSTRACT

An apparatus includes a buffer that collects store instruction information associated with one or more processes. The collected store instruction information includes data and addresses where the data are to be stored. The apparatus also includes a buffer control that drains the buffer of store instructions associated with a first process before it collects store instructions associated with a second process.

20 Claims, 6 Drawing Sheets

CONVERTING MERGE BUFFER SYSTEM-KILL ERRORS TO PROCESS-KILL ERRORS

BACKGROUND

Embodiments of the present invention relate generally to handling errors in a processor, and more specifically to handling soft errors in a merge buffer of a microprocessor.

Single bit upsets or errors from transient faults have emerged as a key challenge in microprocessor design. These faults arise from energetic particles—such as neutrons from cosmic rays and alpha particles from packaging material—generating electron-hole pairs as they pass through a semiconductor device. Transistor source and diffusion nodes can collect these charges. A sufficient amount of accumulated charge may change the state of a logic device—such as a static random access memory (SRAM) cell, a latch, or a gate—thereby introducing a logical error into the operation of an electronic circuit. Because this type of error does not reflect a permanent failure of the device, it is termed a soft or transient error.

Soft errors become an increasing burden for microprocessor designers as the number of on-chip transistors continues to grow. The raw error rate per latch or SRAM bit may be projected to remain roughly constant or decrease slightly for the next several technology generations. Thus, unless error protection mechanisms are added or more robust technology (such as fully-depleted silicon-on-insulator) is used, a microprocessor's soft error rate may grow in proportion to the number of devices added to semiconductor devices in each succeeding generation.

Bit errors may be classified based on their impact and the ability to detect and correct them. Some bit errors may be classified as "benign errors" because they are not read, do not matter, or they can be corrected before they are used. The most insidious form of error is silent data corruption, where an error is not detected and induces the system to generate erroneous outputs. To avoid silent data corruption, designers may employ error detection mechanisms, such as parity. Error correction techniques may be employed to fix detected errors, although such techniques may not be applied in all situations. The ability to detect an error but not correct it may avoid generating incorrect outputs (by shutting down the affected processes before incorrect outputs are generated), but it may not provide a mechanism to recover and continue executing the affected processes when such an error occurs. Errors in this category may be called detected unrecoverable errors (DUE).

DUE events may be further subdivided according to whether the DUE event results in the operating system and/or another mechanism killing one or more user processes that were impacted by the error or whether the DUE event results in crashing the entire machine, including all of its processes, to prevent data corruption. The first type may be called a "process-kill DUE" event. The second type may be called a "system-kill DUE" event. A process-kill DUE is preferable over a system-kill DUE because a process-kill DUE allows the system to continue running and servicing the processes not affected by the error. For example, large-scale computer systems may execute hundreds of processes at a time. Therefore, isolating a transient error to one process (or a small set of processes) and killing just that process (or small set of processes) would provide a substantial advantage over crashing the entire system and killing all of the processes then being executed.

Thus a need exists for converting merge buffer system-kill errors to process-kill errors.

BRIEF DESCRIPTION OF THE DRAWINGS

Various embodiments of the present invention are illustrated by way of example and not limitation in the figures of the accompanying drawings, in which like references indicate similar elements.

DETAILED DESCRIPTION

A method, apparatus, and system for converting merge buffer system-kill errors to process-kill errors are described. In the following description, for purposes of explanation, numerous specific details are set forth in order to provide a thorough understanding of embodiments of the invention. It will be apparent, however, to one skilled in the art that embodiments of the invention can be practiced without these specific details. In other instances, structures and devices are shown in block diagram form in order to avoid obscuring embodiments of the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

To address soft errors introduced by transient faults, microprocessor designers may include a variety of protection features. Examples of protection features that may be used are parity, error correcting code (ECC), cyclic redundancy checking (CRC), lock-stepping, radiation-hardened cells, and silicon-on insulator manufacturing technology. Use of these protection features may, however, be a compromise between performance and susceptibility to errors. One example of such a tradeoff may occur in a processor's merge buffer.

Figure 5:
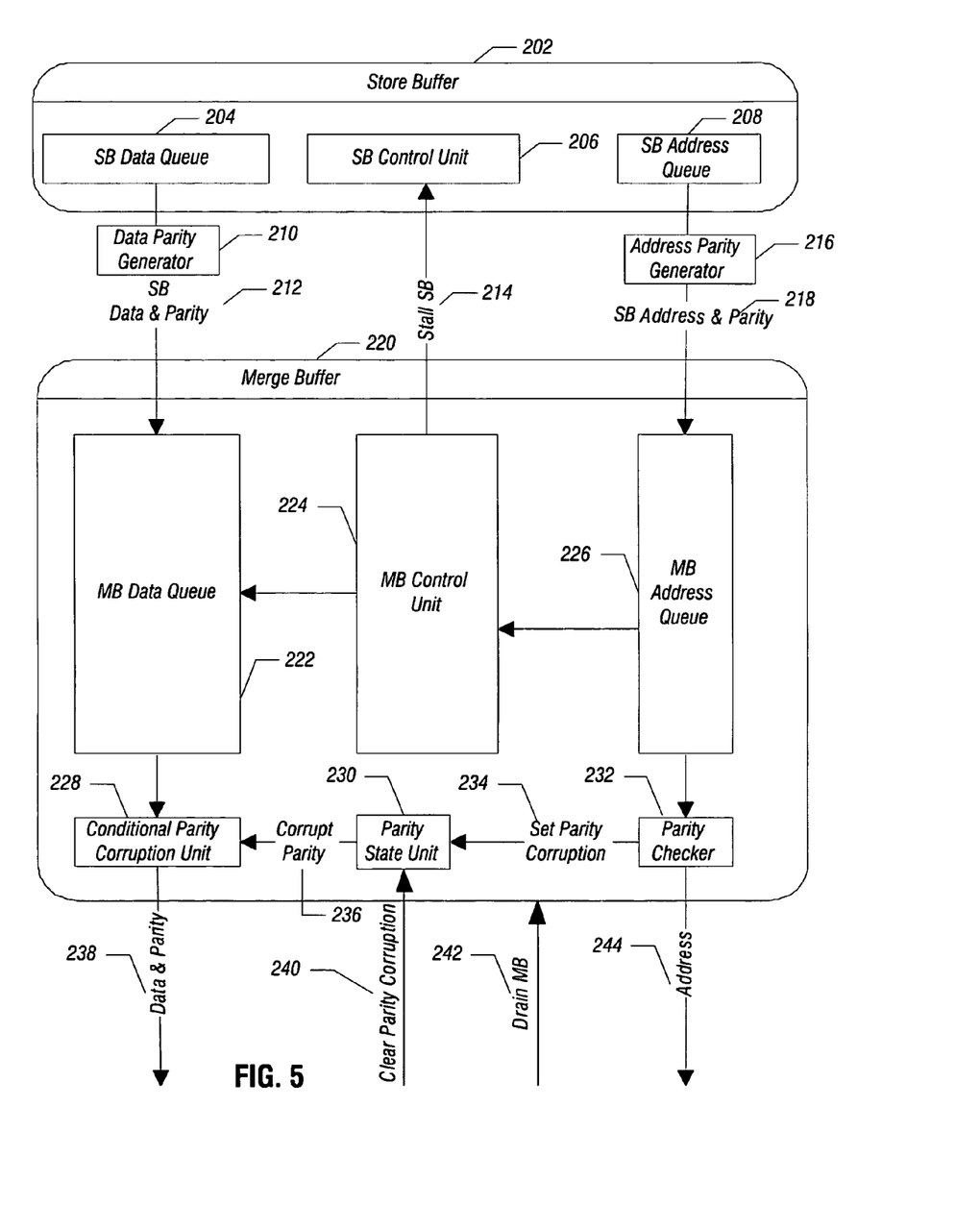
FIG. 5 is a block diagram of a merge buffer according to an embodiment of the present invention.

Referring now to FIG. 5, shown is a block diagram of a merge buffer 220 according to an embodiment of the present invention. The merge buffer 220 collects the results of store instructions executed by the processor for later batch delivery to a cache and/or a memory (such as a system memory). The merge buffer 220 may improve a processor's performance by coalescing multiple writes (e.g., each consisting of data words) into a single cache block (e.g., consisting of multiple data words) and then writing one or more cache blocks to the cache system, instead of writing individual data words separately. Because the merge buffer 220 often holds the most recent data produced in the execution of a program, a processor may allow load instructions to perform a content addressable match (CAM) against the merge buffer 220 to find the most recent data to service the load instructions. Consequently, the merge buffer 220 may be the critical path of load-to-use, the latency of which is critical for many programs, such as database codes that have pointer chasing.

Implementing error detection and correction features, such as ECC, in the merge buffer 220, particularly in connection with address errors, may significantly increase the load-to-use latency, thereby unacceptably degrading processor performance for some applications, or may significantly increase the complexity of the design. Error detection and correction features, such as ECC, involve a read-modify-write operation which takes longer than just detecting errors. For example a parity error can be detected by a faster exclusive-OR (XOR) comparison operation. Therefore, maintaining acceptable performance may limit error handling in latency sensitive data storage situations, such as the merge buffer 220, to detecting errors without correcting them.

However, not correcting errors when they are detected may result in detected unrecoverable errors or DUE events which may result in killing one or more processes being executed by the system (a process-kill DUE event) or even shutting down the entire system (a system-kill DUE event). In a merge buffer that does not include an embodiment of the present invention, a corrupted address in the merge buffer results in a system-kill DUE because multiple processes may have committed their data to the merge buffer and the operating system has no way of identifying the specific process or processes to which the corrupted address belongs. To avoid generating erroneous outputs the operating system may have no choice but to halt all processes and shut the entire system down. Converting a corrupted address in the merge buffer 220 from a system-kill DUE event to a process-kill DUE event, as provided by embodiments of the present invention, may significantly lessen the impact of such address corruption errors.

Still referring to FIG. 5, in one embodiment of the present invention, the merge buffer 220 may be flushed or drained every time the processor's execution flow is changed to execute a different process such that the merge buffer 220 collects store instructions associated with just one application or process at any given time. For example, the processor may be executing an email program and then change to execute a computer game. Store instructions associated with the email program collected in the merge buffer 220 may be flushed or drained from the merge buffer in connection with the processor changing to execute the computer game program. In another embodiment, the merger buffer 220 may be drained on selected process changes. In one embodiment, the merge buffer 220 may operate in a purge mode, which may cause the merge buffer 220 to write out store instructions (e.g., via the flush or drain operation) as soon as possible to minimize the potential for corruption of store instructions in the merge buffer 220. In one embodiment, the merge buffer 220 may be flushed or drained (partially or fully) when the merge buffer 220 is full to make room for new store instructions to be collected in the merge buffer 220.

In one embodiment, the merge buffer 220 may be flushed or drained by writing the store instructions present in the buffer to a cache memory and/or another memory (such as a system memory). In addition, the contents of the merge buffer 220 may be cleared or marked invalid to prepare the merge buffer 220 to collect store instructions associated with another process. In one embodiment, a drain merge buffer (drain MB) signal 242 may be used to drain or flush the merge buffer. In one embodiment, the drain MB signal 242 may be asserted in response to a flush merge buffer instruction of a processor. In one embodiment, the drain MB signal 242 may be asserted by a unit of the processor that detects errors and/or other conditions in which the merge buffer 220 should be drained.

The store instructions collected in the merge buffer 220 may be checked for errors (e.g., in their address and/or data) when the store instructions are written out of the merge buffer 220. In one embodiment, an address parity generator 216 may generate a parity bit for each address that is written into a merge buffer address queue 226 and a parity checker 232 may check the address and parity information before it is written out of the merge buffer 220 on address lines 244. In one embodiment, the address parity generator 216 may provide store buffer address and parity information 218 to the merge buffer address queue 226. In one embodiment, data errors may be detected in a similar manner when data is written out of the merge buffer 220 on data and parity lines 238. If an error (address and/or data) is detected and the merge buffer 220 was flushed in connection with the last process change, the error can be known to be associated with the current process being executed by the processor. With that information, the operating system (or other error mapping mechanism) can map the error to the appropriate process and kill just that process, rather than the entire system. Thus, flushing or draining the merge buffer 220 in connection with process changes may result in the merge buffer 220 containing data from one process at time and thereby convert what may otherwise be system-kill DUE events in the merge buffer 220 to process-kill DUE events.

Still referring to FIG. 5, the merge buffer 220 may also include a merge buffer data queue 222 to store data associated with the store instructions. In one embodiment, a data parity generator 210 may generate a parity bit for each datum that is written into the merge buffer data queue 222. In one embodiment, the data parity generator 210 may provide store buffer data and parity information 212 to the merge buffer data queue 222. In one embodiment, the data parity information may be used by a cache memory or system memory to detect errors in data received from the merge buffer 220 over a data and parity signal 238.

In one embodiment, a detected address error in the merge buffer may also generate a corresponding data error. In one embodiment, the merge buffer 220 may include a set parity corruption signal 234 to set a corrupt parity state in a parity state unit 230 when an address error is detected. The parity state unit 230 may generate a corrupt parity signal 236 as an input to a conditional parity corruption unit 228 to generate an override data parity error when the address parity checker 232 has detected a corresponding address parity error. In one embodiment, the set parity corruption signal 234, parity state unit 230, corrupt parity signal 236, and conditional parity corruption unit 228 may effectively "poison" the data corresponding to a corrupted address to prevent the data associated with the corrupted address from being used by any processor. In one embodiment, the data corresponding to a corrupted address in the merge buffer 220, and data for all or some of the subsequent store instructions stored in the merge buffer 220 associated with that same process, may be "poisoned" to prevent the data from being used by any processor. A clear parity corruption signal 240 may be used to reset the state of the parity state unit 230 and prevent the conditional parity corruption unit 228 from overriding the data parity information stored in the merge buffer data queue

222. The merge buffer 220 may also include a merge buffer control unit 224 to control the operation of the merge buffer unit 220.

Still referring to FIG. 5, a store buffer 202 may be used in conjunction with the merge buffer 220 to collect store instructions that are being executed speculatively by the processor. The store buffer 202 may include a store buffer address queue 208 and a store buffer data queue 204 to store addresses and data, respectively, associated with speculative store instructions. The store buffer 202 may also include a store buffer control unit 206 for controlling when the store buffer 202 sends store instructions that have been resolved (i.e., that are no longer speculative) to the merge buffer 220. In one embodiment, the merge buffer control unit 224 may assert a stall store buffer (stall SB) signal 214 to prevent the store buffer from sending store instructions to the merge buffer 220. For example, if the merge buffer 220 is full, the merge buffer control unit 224 may prevent the store buffer 202 from sending additional store instructions until the merge buffer 220 has drained all or some of its contents to a cache memory and/or a system memory.

Figure 1:
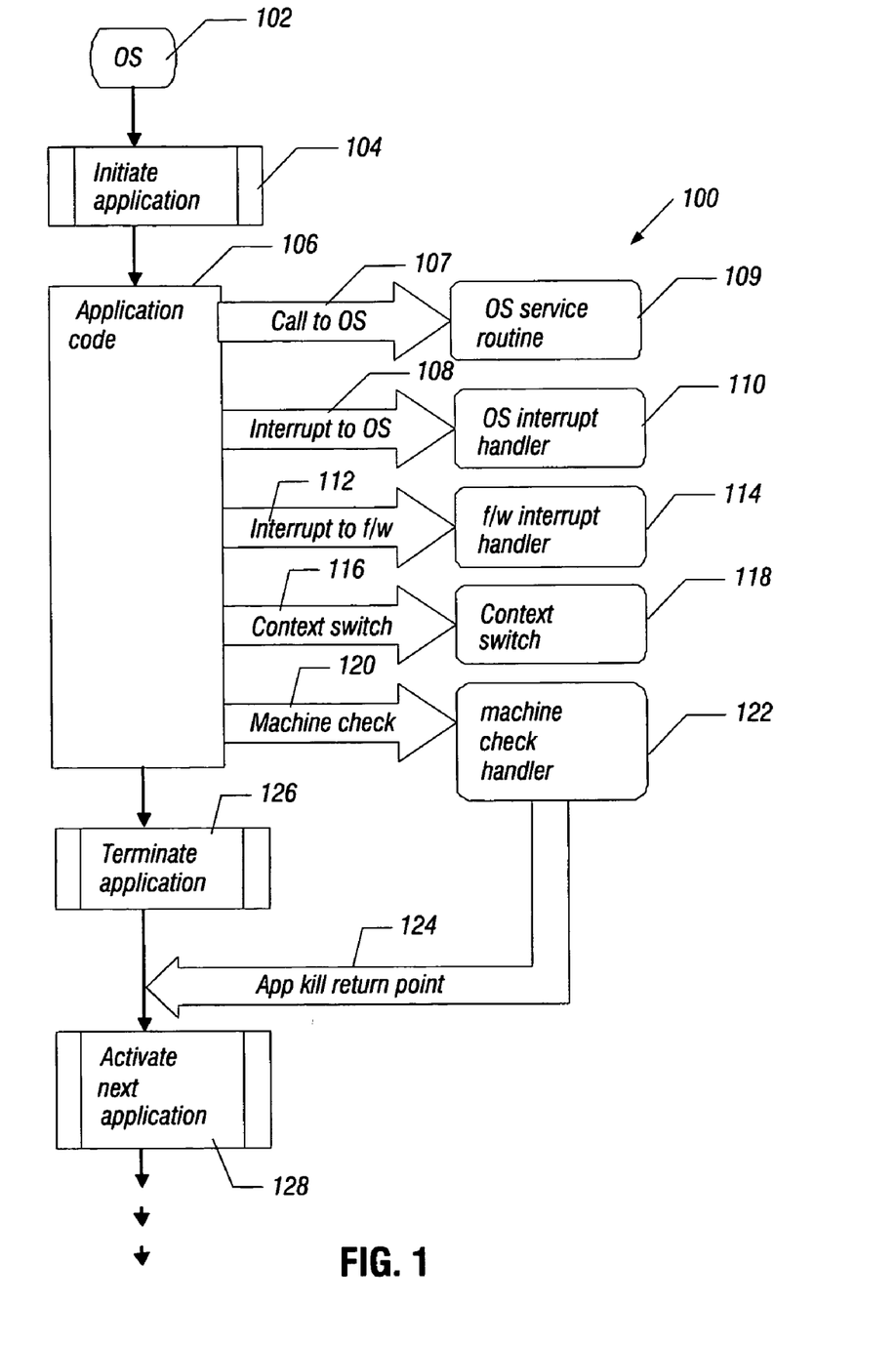
FIG. 1 is a flow diagram illustrating a software execution method according to an embodiment of the present invention.

Referring now to FIG. 1, shown is a flow diagram illustrating a software execution method 100 according to an embodiment of the present invention. An operating system may be launched to establish an operating environment for a computing system (block 102). In one embodiment, the operating system may be the Microsoft™ Windows™ operating system. In another embodiment, the operating system may be the Linux™ operating system. In yet other embodiments, other operating systems may be used. After the operating system is launched (block 102) an application may be initiated (block 104). The application may be a user application (such as word processing, spreadsheet, or game programs), a system application, or other type of application software.

During the execution of the application code (block 106), a number of events may occur to change from executing the application code associated with the current process to executing code associated with another process. For example, a call to the operating system (OS) (arrow 107) may vector execution to an operating system (OS) service routine (block 109). Similarly, an interrupt to the operating system (arrow 108) may vector execution to an operating system (OS) interrupt handler (block 110). Another change in the software execution may occur due to an interrupt to firmware (arrow 112), which may cause execution to vector to a firmware interrupt handler (block 114). Similarly, a context switch (arrow 116) may vector execution to a context switch handler (block 118). Yet another interrupt to execution of application code may occur due to a machine check (arrow 120), which may cause software execution to vector to a machine check handler (block 122). As will be discussed in more detail, the machine check handler may terminate the application in some circumstances and return to an application kill return point (arrow 124).

In the event of no interrupt or change to the normal execution of the application code (block 106), execution of the application code may continue until the application terminates either under user control, operating system control, or for some other reason (block 126). After termination of the application, another application may be activated (block 128). Further details of the processes when execution is vectored to operating system (OS) service routine (block 109), OS interrupt handler (block 110), firmware interrupt handler (block 114), and context switch (block 118) will now be discussed in connection with FIG. 2.

Figure 2:
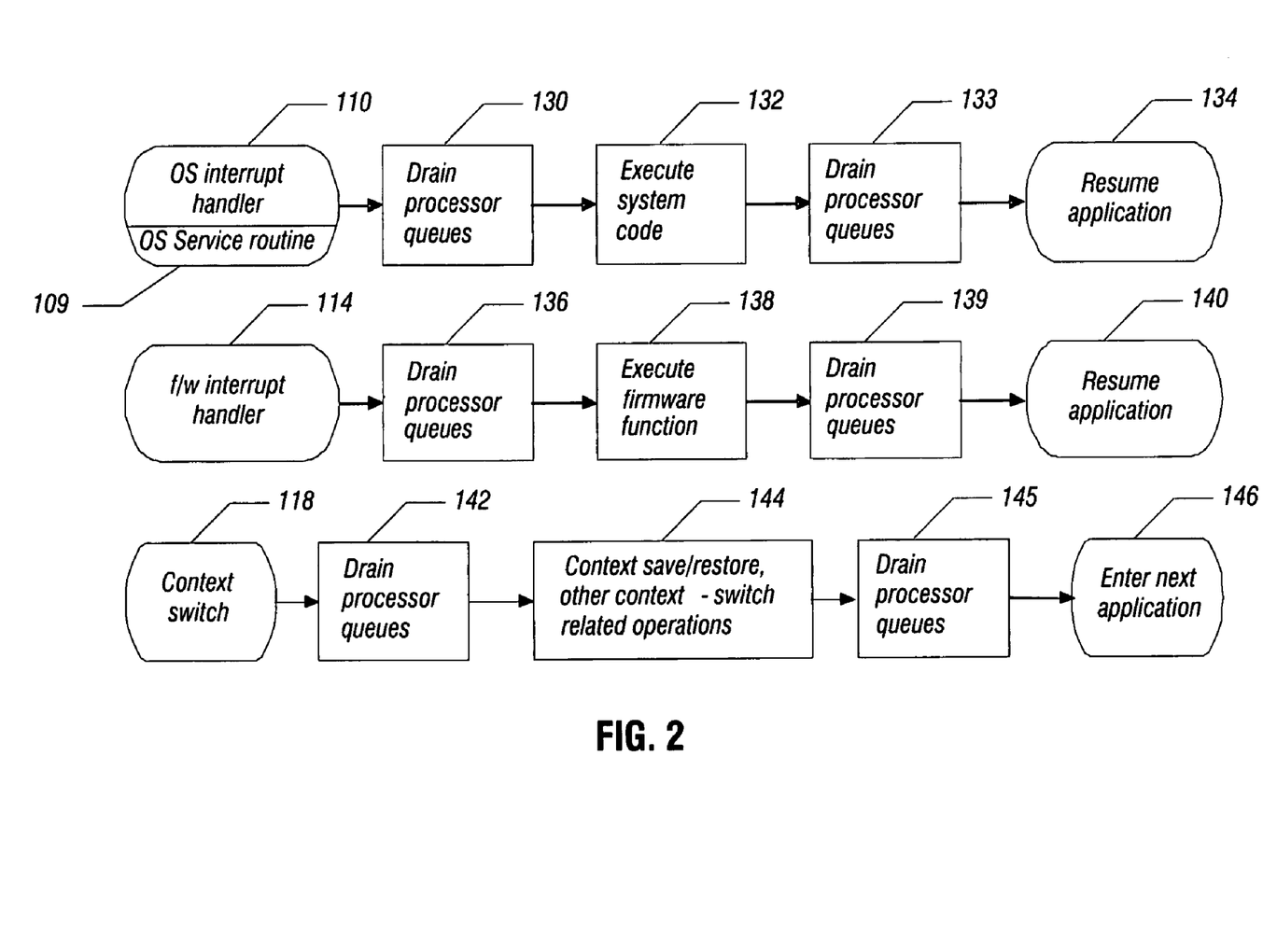
FIG. 2 is a flow diagram illustrating an operating system service call and interrupt handler, a firmware interrupt handler and a context switch according to an embodiment of the present invention.

Referring now to FIG. 2, shown are flow diagrams of the operating system (OS) service call (block 109), the OS interrupt handler (block 110), the firmware interrupt handler (block 114), and the context switch (block 118). When software execution is vectored to the OS service routine (block 109) or the OS interrupt handler (block 110), one or more processor core queues or buffers may be drained (block 130). In one embodiment a merge buffer may be drained such that the store instructions contained in the merge buffer are associated with one process or application at any given time. After the appropriate processor queues or buffers are drained, execution of system code associated with the appropriate operating system service routine or operating system interrupt handler may be executed (block 132). After the system code is executed (block 132), one or more processor core queues or buffers (including the merge buffer) may be drained (block 133) and execution of the interrupted application code may be resumed (block 134).

Similarly, during the execution of application code (block 106 of FIG. 1), a firmware interrupt handler event (block 114) may result in the draining of one or more processor queues or buffers (block 136). In one embodiment, the merge buffer may be drained in connection with a firmware interrupt handler event such that the merge buffer is drained before the execution of the new firmware software begins (block 138). After execution of the firmware software (block 138), one or more processor core queues or buffers (including the merge buffer) may be drained (block 139) and execution of the interrupted application may be resumed (block 140).

Still referring to FIG. 2, interruption of the execution of application code (block 106 of FIG. 1) due to a context switch event (block 118) may also result in the draining of one or more processor queues or buffers (block 142). A context switch typically occurs when execution of one application code or process is halted in order to execute another application code or process. In this event, a processor merge buffer may be drained such that the merge buffer contains store information associated with one process at any given time. In this manner, a corrupted address stored in the merge buffer may be associated with the current process thereby allowing that process to be killed rather then requiring the entire system to be halted. After the appropriate processor queues are drained (block 142), various context save/restore and other context switch related operations may be performed (block 144). After completion of the context switch related operations (block 144), one or more processor core queues or buffers (including the merge buffer) may be drained (block 145) and execution may jump to the next application (block 146).

Figure 3:
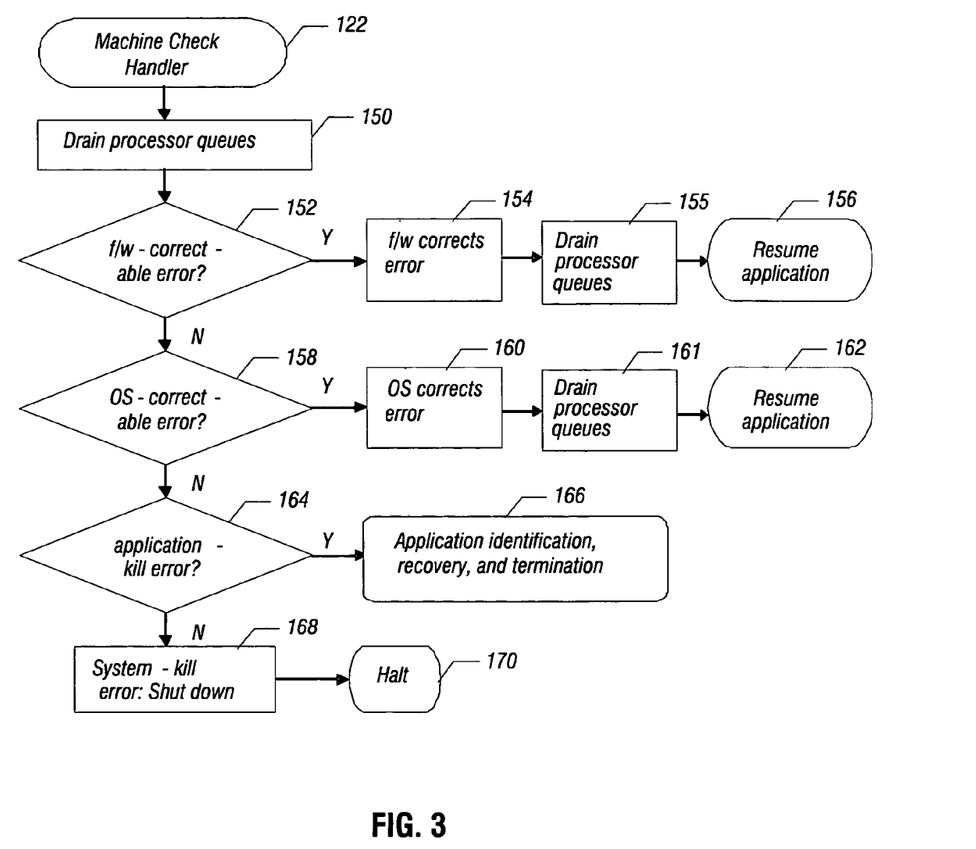
FIG. 3 is a flow diagram illustrating a machine check handler according to an embodiment of the present invention.

Referring now to FIG. 3, shown is a flow diagram illustrating the machine check handler (block 122) according to one embodiment of the present invention. Vectoring execution to a machine check handler may occur when an error in the processor has been detected. After initiating the machine check handler (block 122), one or more processor queues or buffers may be drained in order to gather error information for errors identified throughout the processor (block 150). The machine check handler may analyze the error information to determine what corrective actions might be appropriate. For example, it may determine whether the error is firmware correctable or not (diamond 152). If so, the firmware may correct the error (block 154), one or more processor core queues or buffers (including the merge buffer) may be drained (block 155), and execution of the application that was interrupted may be resumed (block 156). In one embodiment, a processor abstraction layer (PAL) firmware may determine whether an error is a processor error that may be corrected by the PAL.

If the error is not correctable by firmware (diamond 152), the machine check handler may determine whether the error is correctable by the operating system or some other system-level software or mechanism (diamond 158). If so, the operating system or other system-level software or mechanism may correct the error (block 160), one or more processor core queues or buffers (including the merge buffer) may be drained (block 161), and execution of the interrupted application may be resumed (block 162). In one embodiment, a software abstraction layer (SAL) may work in conjunction with the operating system to resolve system-level errors.

Still referring to FIG. 3, if the error is not correctable at the operating system level (diamond 158), the machine check handler may determine whether the error is an application-kill DUE or process-kill DUE error (diamond 164). For example, it may be determined whether the error is associated with one or more specific processes or applications running on the machine such that the specific process (es) or application(s) may be killed rather than bringing down the entire system. If the error cannot be determined to be associated with just one or more specific applications (diamond 164), that may indicate the error is a system-kill DUE which may require the entire system to shut down (block 168) and execution of all processes to be halted (block 170). If the error is determined to be an application or process kill error (diamond 164), the associated process (es) or application(s) may be identified, and steps may be taken to recover and/or terminate the affected application(s) (block 166). Further explanation of the identification, recovery, and termination procedures will now be discussed in connection with FIG. 4.

Figure 4:
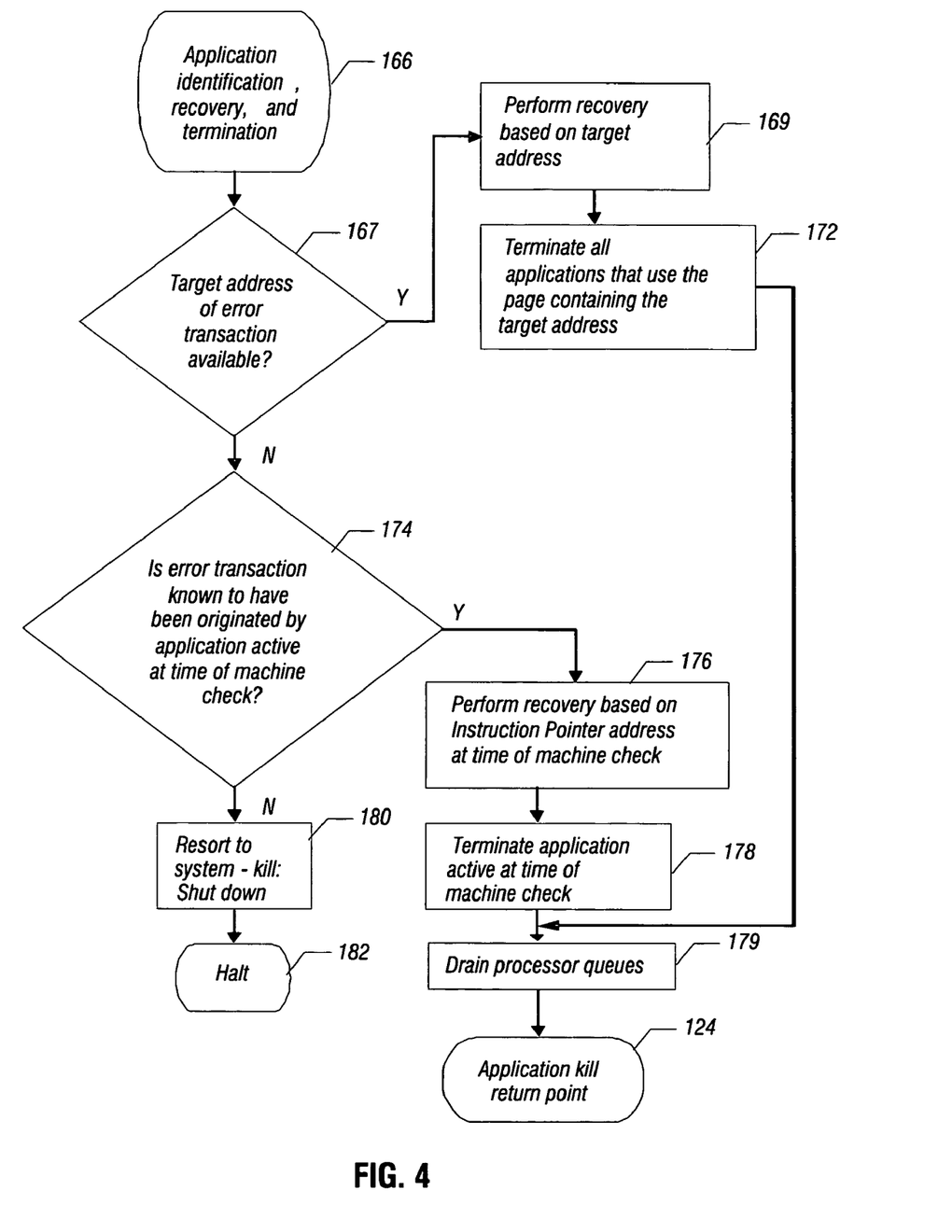
FIG. 4 is a flow diagram illustrating a method for application identification, recovery, and termination according to an embodiment of the present invention.

Referring now to FIG. 4, shown is a flow diagram illustrating a method for application identification, recovery, and termination according to an embodiment of the present invention. After determining that an error is not an application-kill error (diamond 164 of FIG. 3), the machine check handler may determine whether the target address of the error transaction is available (diamond 167). If so, the processor may perform recovery based on the target address (block 169) and terminate all applications that use the memory page containing the target address (block 172). Then the machine check handler may drain one or more processor core queues or buffers (including the merge buffer) (block 179) and return execution to the application kill return point (block 124).

However, the target address of the error transaction may not always be available. For example, if an address in the merge buffer is corrupted due to a transient fault, the true address associated with the error may not be known. If the machine check handler determines that the target address of the error transaction is not available (diamond 167), the machine check handler may determine whether the error transaction is known to have been originated by the application active at the time the machine check (diamond 174). In one embodiment, address corruption errors that occur in a processor's merge buffer may be associated with the application or process being executed (e.g., the active process) when the error is detected if the merge buffer has been drained before the processor started executing that process. For example, draining the merge buffer in connection with blocks 130, 136, 142 and 150 of FIGS. 2 and 3 may guarantee that the application active at the time of the machine check is the application associated with a corrupted address error detected in the merge buffer. In this manner, draining the merge buffer before switching to execute a different process may allow a processor to identify an application associated with a merge buffer address error and kill just that application rather than resort to a system kill shut down (block 180) and halting the processor (block 182).

If the processor can identify the error transaction as originating with the application active at the time of the machine check (diamond 174), the processor may perform recovery techniques based on the instruction pointer address at the time of them machine check (block 176), terminate, if necessary, the application that was active at the time of the machine check (block 178), drain one or more processor core queues or buffers (including the merge buffer) (block 179), and return to the application kill return point (block 124).

Figure 6:
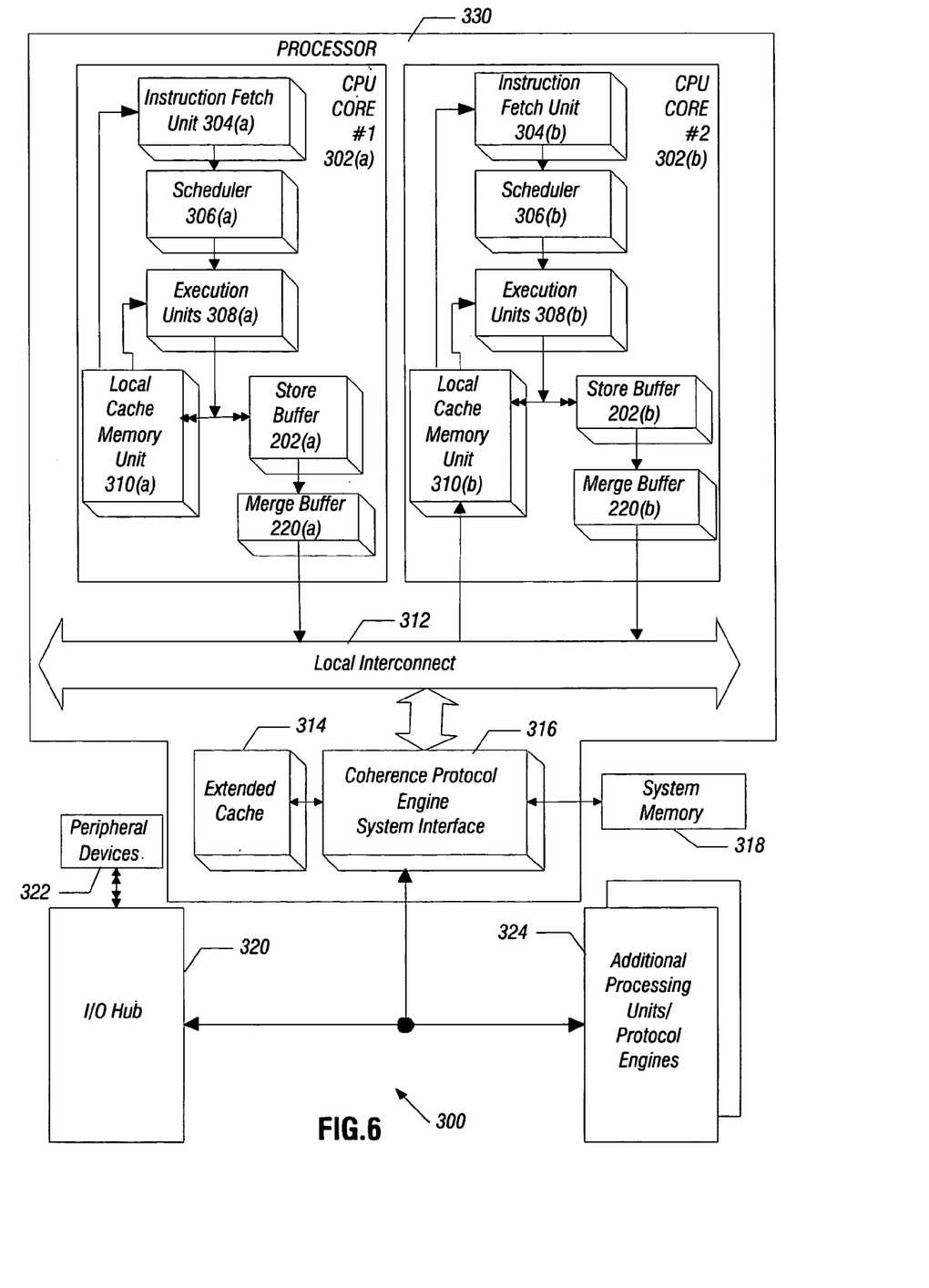
FIG. 6 is a block diagram of a computer system with which embodiments of the invention may be used.

Referring now to FIG. 6, shown is a block diagram of computer system 300 with which embodiments of the invention may be used. In one embodiment, computer system 300 includes a processor 330, which may include a general-purpose or special-purpose processor such as a microprocessor, microcontroller, a programmable gate array (PGA), and the like. As used herein, the term "computer system" may refer to any type of processor-based system, such as a desktop computer, a server computer, a laptop computer, or the like, or other type of host system.

The processor 330 is shown to include two central processing unit (CPU) cores 302(a) and 302(b), but may include one or more such cores. The CPU cores 302(a) and 302(b) may include instruction fetch units 304(a) and 304(b), respectively, for fetching instructions, scheduler units 306(a) and 306(b), respectively, for scheduling execution of instructions, execution units 308(a) and 308(b), respectively, for executing instructions, and one or more local cache memory units 310(a) and 310(b), respectively, for storing local copies of data. The CPU cores 302(a) and 302(b) may also include store buffers 202(a) and 202(b), respectively, and merge buffers 220(a) and 220(b), respectively, which may be implemented according to various embodiments of the present invention.

Still referring to FIG. 6, the processor 330 may include a local interconnect 312 to allow various units of the processor 330 to communicate and exchange data. The processor 330 may also include a coherence protocol engine and system interface 316 to provide cache coherency and system memory interface functions in connection with an extended cache 314 and system memory 318. In one embodiment, the extended cache may be shared by the multiple CPU cores 302(a) and 302(b) of the processor 330. In one embodiment, the extended cache 314 may be a write-through cache and the local caches 310(a) and 310(b) may be write-back caches. In one embodiment, the local caches 310(a) and 310(b) may include level one and level two caches that are 8 K bytes and 256 K bytes, respectively, and the extended cache 314 may be a 16 M byte level three cache. In one embodiment, the merge buffers 220(a) and 220(b) may collect the results of store instructions and periodically write blocks of store instruction results to the extended cache 314 and/or the system memory 318 to reduce traffic on the local interconnect 312.

The processor 330 may also be coupled to an input/output (I/O) hub 320 that may be coupled to one or more peripheral devices 322 via an input/output (I/O) expansion bus. The peripheral devices 322 may in one embodiment include storage devices, such as a floppy disk drive and input devices, such as a keyboard and a mouse. The I/O hub 320 may also be coupled to, for example, a hard disk drive and a compact disc (CD) drive. It is to be understood that other storage media may also be included in the system. The processor 330 may also be coupled to one or more additional processing units or protocol engines 324, such as a graphics engine, a network engine or an internet protocol engine.

Embodiments may be implemented in logic circuits, state machines, microcode, or some combination thereof. Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), dynamic random access memories (DRAMs), erasable programmable read-only memories (EPROMs), flash memories, electrically erasable programmable read-only memories (EEPROMs), magnetic or optical cards, or any type of media suitable for storing electronic instructions.

Thus, a method, apparatus, and system for converting merge buffer system-kill errors to process-kill errors has been described. While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
a merge buffer to collect store instructions associated with one or more processes, wherein the store instructions include data and addresses where the data are to be stored; and
a buffer control to always drain the merge buffer of store instructions associated with a first process before the merge buffer collects store instructions associated with a second process.

2. The apparatus of claim 1, further comprising:
an error checker to detect at least one error in the store instructions; and
a kill unit to halt the first process if the error checker detects a first error in a first store instruction associated with the first process.

3. The apparatus of claim 2, wherein the store instructions also include error information corresponding to the store instructions, and wherein the error checker is to detect the at least one error based on the error information.

4. The apparatus of claim 3, wherein the error information is parity information.

5. The apparatus of claim 2, further comprising a parity corruption unit to indicate a corresponding data error when the first error is a first address error.

6. The apparatus of claim 2, wherein the merge buffer is to enable the first error to be handled as a process-kill error rather than as a system-kill error.

7. The apparatus of claim 1, wherein the merge buffer is to collect store instructions associated with one process at a time.

8. An apparatus comprising:
a processor core to execute one or more processes;
a store buffer to store one or more speculative store instructions until they are ready to be committed to machine state;
a merge buffer to store the committed store instructions, wherein the committed store instructions are associated with the one or more processes, wherein the committed store instructions include data, addresses where the data are to be stored, and error information; and
a merge buffer control to always flush the merge buffer if the processor core changes from execution of a first process to execution of a second process.

9. The apparatus of claim 8, further comprising:
an error checker to detect at least one error in the committed store instructions based on the error information; and
a kill unit to halt execution of the first process if the error checker detects a first error in a first committed store instruction associated with the first process.

10. The apparatus of claim 9, further comprising a parity corruption unit to indicate a corresponding data error when the first error is a first address error.

11. The apparatus of claim 9, wherein the merge buffer is to enable the first error to be handled as a process-kill error rather than a system-kill error.

12. The apparatus of claim 8, wherein the merge buffer is to collect store instructions associated with one process at a time.

13. An article comprising a machine-accessible storage medium storing instructions that when executed enable a system to:
collect store instructions associated with a first process in a merge buffer, wherein the store instructions include data, addresses, and error information; and
always drain the collected store instructions associated with the first process from the merge buffer before collecting store instructions associated with a second process.

14. The article of claim 13, further comprising instructions that when executed enable the system to collect store instructions associated with one process at a time in the merge buffer.

15. The article of claim 13, further comprising instructions that when executed enable the system to handle a first error associated with a first store instruction associated with the first process as a process-kill error rather than a system-kill error.

16. A system comprising:
a processor to execute instructions, including store instructions, associated with one or more processes;
a dynamic random access system memory coupled to store the instructions for execution by the processor;
a merge buffer to collect information associated with the store instructions, including data to be stored, addresses where the data are to be stored, and error information; and
a merge buffer control to always flush the merge buffer if the processor changes from execution of a first process to execution of a second process.

17. The system of claim 16, further comprising:
an error checker to detect at least one error in the store instructions based on the error information; and
a kill unit to halt execution of the first process if the error checker detects a first error associated with a first store instruction associated with the first process.

18. The system of claim 17, further comprising a parity corruption unit to indicate a corresponding data error when the first error is a first address error.

19. The system of claim 17, wherein the merge buffer is to enable the first error to be handled as a process-kill error rather than a system-kill error.

20. The system of claim 16, wherein the merge buffer is to collect store instructions associated with one process at a time.

* * * * *